United States Patent

Edmonds

[15] 3,680,222

[45] Aug. 1, 1972

[54] APPARATUS FOR BLENDING PULVERULENT MATERIAL

[72] Inventor: James C. Edmonds, Catasauqua, Pa.

[73] Assignee: Fuller Company

[22] Filed: Oct. 30, 1970

[21] Appl. No.: 85,572

[52] U.S. Cl. ................................................34/57 A
[51] Int. Cl. ..............................................F26b 17/00
[58] Field of Search........34/57 A, 234; 259/DIG. 17; 263/21 A

[56] References Cited

UNITED STATES PATENTS

| | | | |
|---|---|---|---|
| 2,761,668 | 9/1956 | Sylvest | 263/21 A |
| 2,371,619 | 3/1945 | Hartley | 34/57 A |
| 3,546,787 | 12/1970 | Horner et al. | 34/57 A |
| 2,244,195 | 6/1941 | Hasselbach | 259/18 |
| 2,844,361 | 7/1958 | Dilcher et al. | 259/1 R |

FOREIGN PATENTS OR APPLICATIONS 703,310  2/1965  Canada.................259/DIG. 17

*Primary Examiner*—Carroll B. Dority, Jr.
*Attorney*—Jack L. Prather and Frank H. Thomson

[57] ABSTRACT

Apparatus for blending pulverulent material which employs the technique of fluidizing the material by means of an aerated silo bottom. The silo bottom is divided into quadrants with air under pressure supplied to each quadrant. While each of the quadrants is being aerated, a greater volume of air may be supplied to any one of the quadrants so that the material in that quadrant will spill over onto the adjacent quadrants and the material in the adjacent quadrants will flow into that quadrant to thereby blend the material in the silo. The apparatus employs a novel aeration unit which includes a gas conducting pipe dimensioned to act as a receiver so that the aeration units may be of substantial length.

7 Claims, 6 Drawing Figures

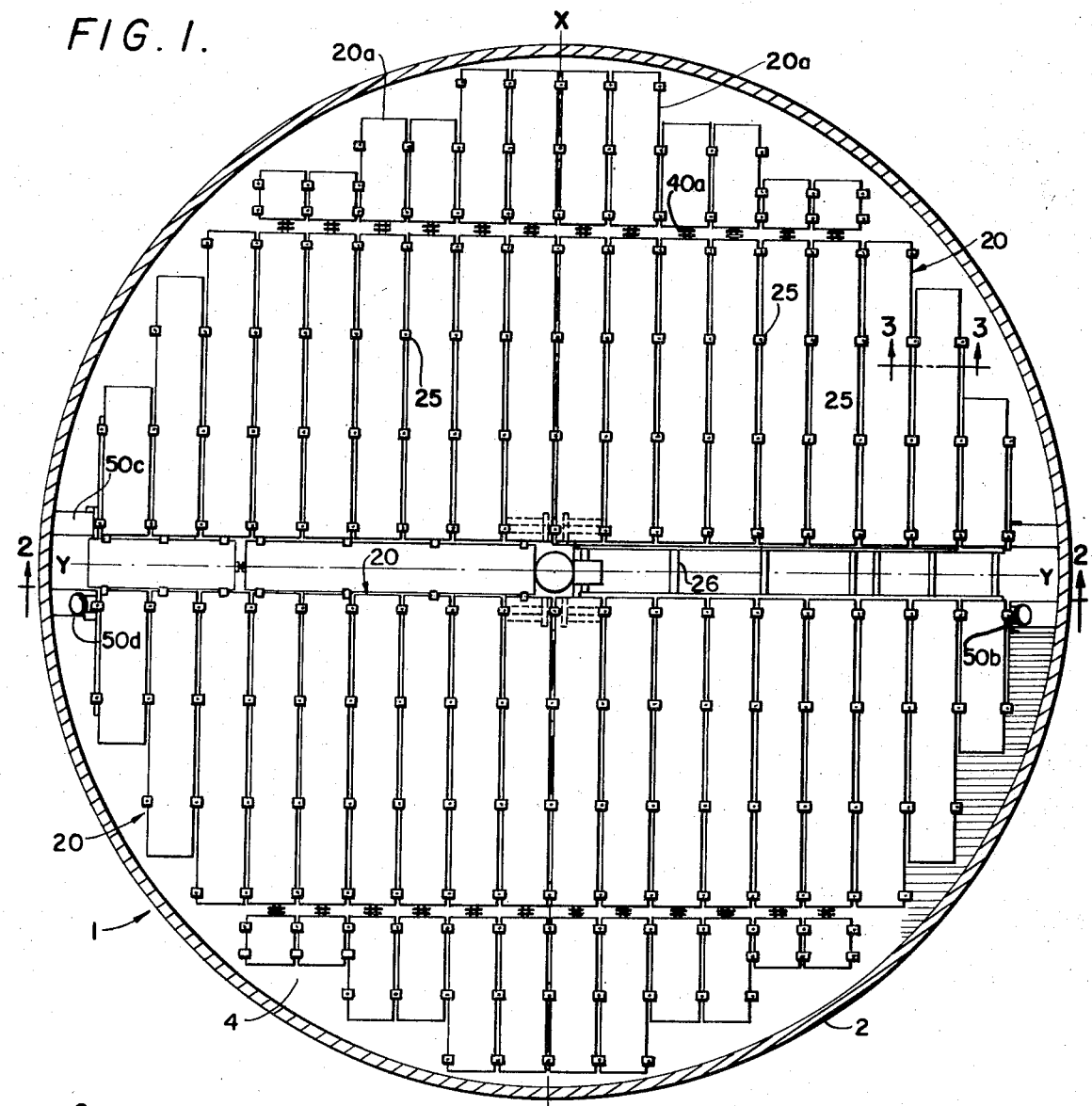
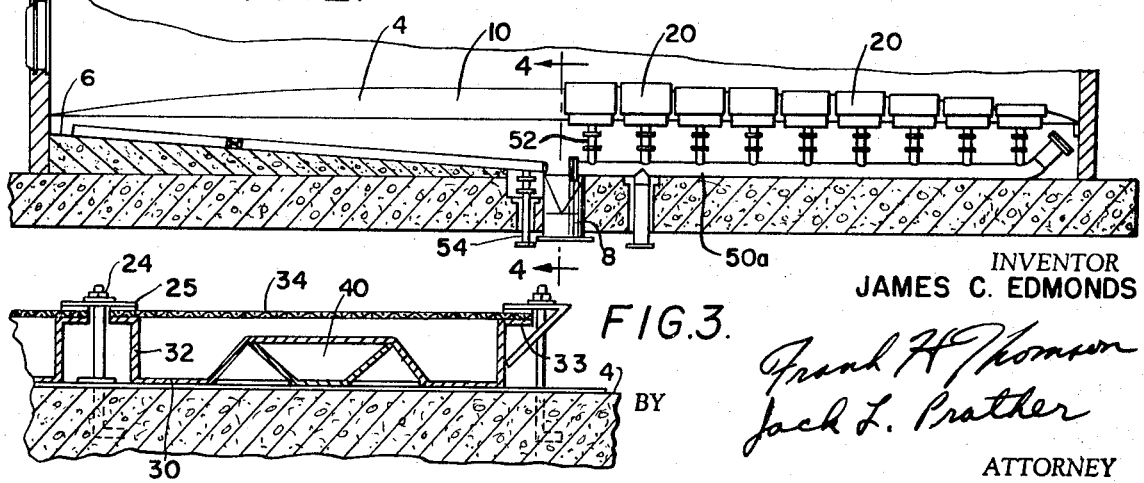
INVENTOR
JAMES C. EDMONDS
BY Frank H. Thomson
Jack L. Prather
ATTORNEY

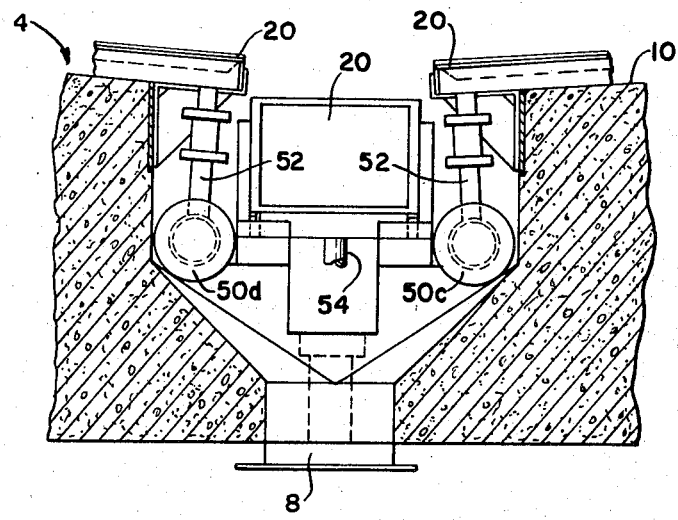
FIG. 4.
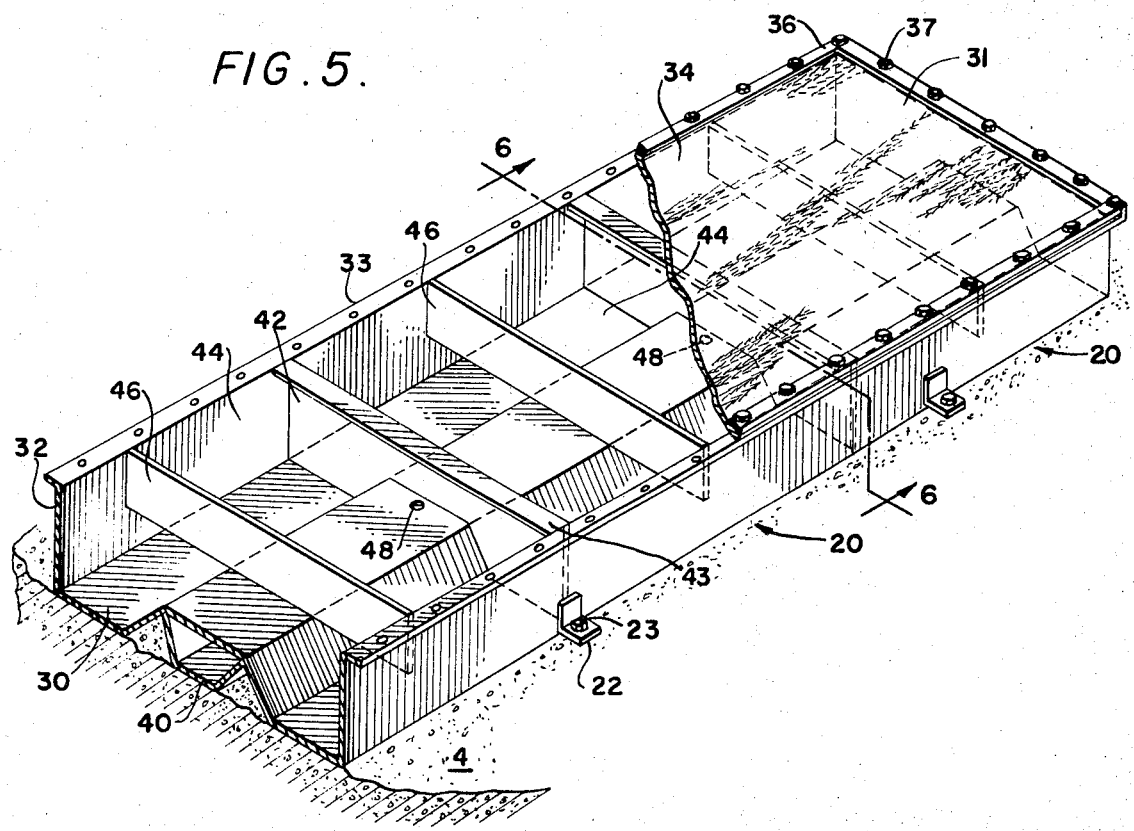
FIG. 5.
FIG. 6.
INVENTOR
JAMES C. EDMONDS
Frank H Thomson
Jack L. Prather
BY
ATTORNEY

APPARATUS FOR BLENDING PULVERULENT MATERIAL

BACKGROUND OF THE INVENTION

This invention relates to blenders for pulverulent material and in particular to an aeration unit for use in such blenders.

Prior to the present invention, blenders of the type to which the present invention relates were known. One such blender is shown in U.S. Pat. No. 2,844,361 wherein a multitude of relatively small aeration units are mounted on the bottom of a silo and the silo is divided into quadrants. Gaseous fluid under pressure is supplied to each of the aeration units to aerate the material in the silo. Gaseous fluid at an increased volume and pressure is supplied to one of the quadrants so that material above that quadrant is fluidized and spills onto the other quadrants. The material in the other quadrants flows into the quadrant supplied with increased volume and pressure fluid. Valving is provided to alter the quadrant which receives the increased volume and pressure fluid.

The above mentioned U.S. Patent used a multitude of small aeration units each of which must be connected by suitable piping to a main air supply conduit. This results in a great many pipes and, together with the large number of small aeration units which must be individually manufactured, results in an expensive installation. An additional disadvantage of the blender shown in U.S. Pat. No. 2,844,361 is that due to the large number of individual aeration units and large amount of piping, servicing the installation can be difficult. It would be desirable to provide a blender which operates in a manner similar to that shown in this patent while providing some means for decreasing installation costs and increasing the serviceability of the unit.

Multiple aeration units for use in blenders are known and one such arrangement is shown in U.S. Pat. No. 2,244,195. These aeration units have the disadvantage that they can only be of short length thus requiring a large number of expensive-to-manufacture aeration units for a single silo. The large number of aeration units leads to the further disadvantage that a large number of small pipes must be used to connect the aeration units to the main air supply. Thus, the apparatus shown in both U.S. Pat. Nos. 2,244,195 and 2,844,361 share the problem of complexity.

SUMMARY

It is, therefore, the principal object of this invention to provide an aeration unit for use in an aerated bottom of a silo for storing and blending pulverulent material which will substantially reduce the complexity of such a bottom.

It is another object of this invention to provide an aerated bin bottom for use in pulverulent material blending silos which will substantially reduce the amount of piping required.

It is still a further object of this invention to provide an aeration unit which is capable of use in any application where it is desired to aerate pulverulent material.

In general, the foregoing and other objects of this invention will be carried out by providing an aerating device adapted for aerating pulverulent material comprising an open topped, gas impervious housing having a bottom, sidewalls and endwalls; means mounted within said housing dividing said housing into a plurality of separate chambers; a gas permeable closure member closing the top of said housing; and means for supplying gas under pressure to each of said chambers; said means for supplying gas including conduit means having a plurality of open orifices therein with at least one of said orifices communicating with each of said chambers so that said conduit means is flow connected in parallel to each of said chambers; said conduit means being dimensioned to act as a gas receiver and said orifices being dimensioned so that the pressure drop across any one orifice is substantially equal to the pressure drop across any other orifice.

BRIEF DESCRIPTION OF THE DRAWINGS

The invention will be described in connection with the annexed drawings wherein:

FIG. 1 is a plan view of an aerated bin bottom for a pulverulent material blender;

FIG. 2 is a sectional view taken on the line 2—2 of FIG. 1 with a portion of the aeration units not shown for purposes of clarity;

FIG. 3 is a section view taken on the line 3—3 of FIG. 1;

FIG. 4 is a fragmentary sectional view taken on the line 4—4 of FIG. 2;

FIG. 5 is a perspective view of the aeration unit of the present invention; and

FIG. 6 is a sectional view taken on the line 6—6 of FIG. 5.

DESCRIPTION OF THE PREFERRED EMBODIMENT

Referring to FIGS. 1 and 2, there is shown an apparatus for blending pulverulent material which includes a silo generally indicated at 1 having sidewalls 2 and a base 4. The base 4 may be of concrete and includes a diametrical trough 6 with a central opening 8 defining a discharge from the silo. The base includes walls 10 which slope downwardly and inwardly from the sidewalls 2 towards the diametrical trough 6. The trough 6 slopes downwardly from the sidewalls 2 towards the discharge opening 8. Suitable valving (not shown) may be provided at the discharge 8 for controlling the discharge of material from the blending silo. Although the illustrated silo shows a central discharge, the discharge may be located on the side of the silo or any other convenient location.

A plurality of aeration units generally indicated at 20 are mounted on the sloping walls 10 of the base 4. As shown in FIGS. 5 and 6, these aeration units are secured to the base 4 by means of angle pieces 22 and fasteners 23. Bolts 24 and washer members 25 may also be used to secure the aeration units 20 to the base 4 and to each other. The aeration units extend in a direction normal to the trough from the trough substantially completely to the sidewalls of the silo. In the embodiment shown, most of the aeration units 20 have been made a standard length for ease of manufacture. Where the size of the silo is such that the standard length aeration unit is not long enough, a shorter aeration unit 20a may be flow connected thereto as by means of a coupling 40a.

An aeration unit 20 may also be mounted in the trough 6. In FIG. 1 only the left side of the trough 6 is provided with an aeration unit. In an actual installation, the right side of the trough would also be provided with an aeration unit, but this has not been shown so that the aeration unit mounting means 26 may be shown.

The aeration units are all substantially identical and their configuration is best shown in FIGS. 5 and 6. The aeration unit includes an opening topped housing having a gas impervious bottom 30, endwalls 31 and sidewalls 32. The sidewalls 32 are provided with a flange 33 having a plurality of holes therein. A gas permeable material 34 such as fabric closes the top of the housing and is secured to the flanges 33 by means of binding strips 36 and fasteners 37.

The bottom 30 of the aeration unit 20 is shaped to define a gaseous fluid conveying conduit 40 which extends for the full length of the aeration unit 20.

The aeration unit 20 is provided with a plurality of divider members 42 which divide the aeration unit 20 into a plurality of separate chambers 44. The dividers 42 include a flange 43 extending along the top of the housing. A strengthening member 46 may be positioned in each of the chambers 44.

The conduit 40 is provided with a plurality of orifices 48 at least one of which is positioned in each of the chambers 44. The orifice 48 is preferably positioned under the flange 43 so that when gaseous fluid is supplied to the chamber 44, it will be dispersed throughout the chamber 44 and not flow directly through the fabric above the orifice 48.

Although in the embodiment shown the conduit forms a part of the bottom 30 of the aeration unit 20, it is intended that the conduit 40 may be a separate pipe. The particular shape of the bottom of the aeration unit is designed to add strength to the unit. In some applications, other shapes may be more desirable. The important feature is that the conduit 40 is dimensioned sufficiently large so that it acts as a receiver so that the pressure in the conduit 40 is substantially equal throughout its length. It is also important that the openings 48 be properly sized so that combined with the size of the conduit 40, the pressure drop across each orifice 48 is substantially the same. By having the conduit 40 so dimensioned, the pressure in the chamber 44 closest to the main air supply conduit is the same as the pressure in the chamber 44 most distant from the main air supply conduit. This insures that the material throughout the silo is aerated substantially the same amount. In one unit tested, a twelve-foot by two-foot aeration unit was provided with fluid supply conduit having a cross-sectional area of 14.7 square inches and an orifice opening of 13/32 inch. The pressure in each chamber was substantially equal.

The aeration units of the present invention are shown as being used in a quadrant type blender and as such, the bin bottom is divided into quadrants as shown by the lines x—x and y—y of FIG. 1. Four pipe means 50a, 50b, 50c and 50d are provided, each for supplying gaseous fluid under pressure from a source (not shown) to the aeration units 20 and 20a of one of the quadrants. A plurality of conduits 52 (FIG. 2) are provided for supplying gaseous fluid under pressure from the main air pipes 50a, 50b, 50c and 50d to the conduit 40 of each of the aeration units. Suitable valving may be provided to vary the pressure and volume of fluid supplied to each quadrant. Such valving may be as shown in U.S. Pat. No. 2,844,361.

With respect to the aeration units mounted in the trough 6, a separate gaseous fluid supply pipe 54 is provided. The operation of the blender may be substantially the same as the blender shown and described in U.S. Pat. No. 2,844,361 and it is believed to be unnecessary to describe such operation in detail. Air under pressure is supplied to each of the quadrants to aerate the material in the blender. Air at increased volume and pressure is supplied to one of the pipes 50a, 50b, 50c, or 50d to fluidize the material above that quadrant. This material spills onto the top of the material in the other quadrants and material in the other quadrants flows into the fluidized quadrant. Suitable valving and controls are provided to shift the quadrant which is supplied with the increased volume and pressure air.

By employing the aeration units of the present invention, the amount of piping necessary to aerate the silo bottom is substantially reduced. Because of the size of the conduit 40, the only piping necessary is the main air supply pipes 50a, 50b, 50c and 50d and the supply pipes 52 connecting the conduit 40 and the pipes 50a, etc. The aeration units extend from the trough 6 to the sidewalls 2 of the silo. By dividing the aeration units into a plurality of chambers, if a "rat hole," area where no material is above a portion of the aeration unit, should occur, all the air supplied to an aeration unit will not flow to that area which is the area of least resistance to air flow. The sizing of the orifices 48 and conduit 40 are important in this respect. Because the pressure drop across each orifice is substantially constant, if a "rat hole" occurs, all air in the pipe 40 will not flow to the chamber 44 below the "rat hole." The material in the remainder of the bin bottom will continue to be properly aerated.

From the foregoing, it should be apparent that the objects of the present invention have been carried out. A blending silo with a substantially reduced amount of piping has been provided. The number of aeration units have been substantially reduced and it is believed that a blending silo of substantially reduced cost has been provided. The aeration units can be made of any desired length. The only limitation is the size which can be practically handled by workmen assembling the blender.

It is intended that the foregoing be merely a description of a preferred embodiment and that the invention be limited solely by that which is within the scope of the appended claims.

I claim:

1. An aerating device adapted for aerating pulverulent material comprising:

an open topped, gas impervious housing having a bottom, sidewalls and endwalls;

means mounted within said housing dividing said housing into a plurality of separate chambers;

a gas permeable closure member closing the top of said housing; and means for supplying gas under pressure to each of said chambers;

said means for supplying gas including conduit means having a plurality of open orifices therein with at least one of said orifices communicating with each of said chambers so that said conduit means is flow connected in parallel to each of said chambers;

said conduit means being dimensioned to act as a gas receiver and said orifices being dimensioned so that the pressure drop across any one orifice is substantially equal to the pressure drop across any other orifice;

the number of orifices in said conduit means is equal to the number of chambers;

said means dividing said housing into a plurality of separate chambers including partition means transversely mounted in said housing and having flange means extending along the top of said housing; said orifices being positioned under said flange means;

said conduit means being integral with and forming a part of the bottom of said housing.

2. The aerating device of claim 1 wherein said conduit is substantially the same length as said housing.

3. Apparatus for blending pulverulent material comprising:
a silo including sidewalls and a base;
said silo base including means defining a diametrical trough and walls which slope downwardly and inwardly toward said trough;
a plurality of aeration units mounted on said base; and
means for supplying gaseous fluid under pressure to said aeration units;
said means for supplying gaseous fluid under pressure including a plurality of pipe means each adapted to supply gaseous fluid under pressure to a contiguous group of said aeration units whereby the volume and pressure of the gaseous fluid supplied to each group of aeration units can be varied so that pulverulent material in said silo can be blended;
said aeration units being mounted on the sloping walls of said base and extending in a direction normal to said trough from said trough substantially completely to the sidewalls of the silo;
each of said aeration units including means dividing it into a plurality of separate chambers and means flow connected to one of said pipe means for supplying each chamber with gaseous fluid under pressure at a volume and pressure substantially equal to that supplied to the other chambers in said aeration unit.

4. The apparatus of claim 3 wherein each of said aeration units further includes conduit means mounted therein flow connected with one of said pipe means and having a plurality of orifices therein with at least one orifice communication with each chamber to thereby define means for supplying each chamber with gaseous fluid.

5. The apparatus of claim 4 wherein said means dividing an aeration unit into a plurality of separate chambers includes partition means transversely mounted in the aeration unit and having flange means extending along the top thereof, said orifices being positioned under said flange means.

6. The apparatus of claim 5 wherein said conduit means is integral with and forms a part of the aeration unit.

7. The apparatus of claim 3 further comprising means defining an outlet in the silo; said trough being sloped toward said outlet; and an aeration unit mounted within said trough.

* * * * *